May 9, 1967             D. A. HILLIS             3,318,443

DISPENSING CONTAINER FOR BAND SAW BLADES

Filed Oct. 8, 1964                                          2 Sheets-Sheet 1

INVENTOR.
DONALD A. HILLIS

BY *Fetherstonhaugh & Co.*

ATTORNEYS

May 9, 1967  D. A. HILLIS  3,318,443
DISPENSING CONTAINER FOR BAND SAW BLADES
Filed Oct. 8, 1964  2 Sheets-Sheet 2

INVENTOR.
DONALD A. HILLIS
BY *Fetherstonhaugh & Co.*
ATTORNEY

United States Patent Office 3,318,443
Patented May 9, 1967

3,318,443
DISPENSING CONTAINER FOR BAND SAW BLADES
Donald A. Hillis, 4828 Yonge St., Willowdale, Ontario, Canada
Filed Oct. 8, 1964, Ser. No. 402,491
6 Claims. (Cl. 206—52)

This invention relates to a dispensing container for band saw blades and the like.

It is common practice to manufacture and package band saw blades in coiled form. Lengths required for use are cut from the free end of the coil as required. Band saw steel is very resilient and when wound in a tight coil exerts a strong force tending to uncoil the coil. This force must be restrained by the package that contains it.

Commonly used packages provide a coil receiving chamber having end walls that restrain the coil from unwinding and have an opening through which the free end of the coil can be withdrawn to dispense a desired amount of blade. The reaction of the coiled saw blade against the end walls of the chamber is substantial and, notwithstanding the fact that the chamber is usually designed such that the area of contact between blade and container at the end walls is small to reduce friction, it is very difficult to withdraw the free end of the blade from the container due to friction between the blade and the end wall of the container. This is especially true of larger coils. These packages are also of a design that requires a range of package sizes to accommodate the range of saw blade sizes. This involves the user in a package stocking problem.

This invention overcomes the difficulty of withdrawing the blade by rolling the free end of the saw blade from the package. The blade is not slid over any end wall surface as it is withdrawn from the container. Instead a series of rollers are mounted in the container in circular arrangement so that their rolling surfaces engage with the outside surface of the roll of saw blade and, as the free end of the saw blade is withdrawn, the rollers turn to permit easy withdrawal of the blade from the package. The rollers are preferably pin pointed on a side wall of the container which is made of two cooperating sections.

The cooperating sections are designed such that more than one size blade can be packed in a container formed from any two sections by the appropriate use of insert disks. Moreover, by using in combination only three different sized sections and inserts, one can accommodate the full range of saw blade widths encountered in commercial use.

The objectives of this invention include the provision of a strong, inexpensive, easy to stock container that can be simply constructed from a minimum number of stock parts to package a complete line of sizes of coil of saw blade and from which a length of saw blade can be easily withdrawn.

With these and other objects in view a container according to this invention comprises a pair of cooperating body members secured together along a meeting line to define therebetween a saw blade receiving chamber that has opposed side walls and end walls extending between the side walls. The side walls support the side of a roll of saw blade in use. Rollers are mounted in the chamber with their rolling surfaces at right angles to a plane containing bearing surfaces of the bearing ribs. The rollers are spaced apart in circular arrangement with their rolling surfaces adapted to roll with respect to the outside face of a coil of saw blade in the chamber as the free end of the blade is drawn through a hole in an end wall.

The invention will be clearly understood after reference to the following detailed specification read in conjunction with the drawings.

Figure 1:
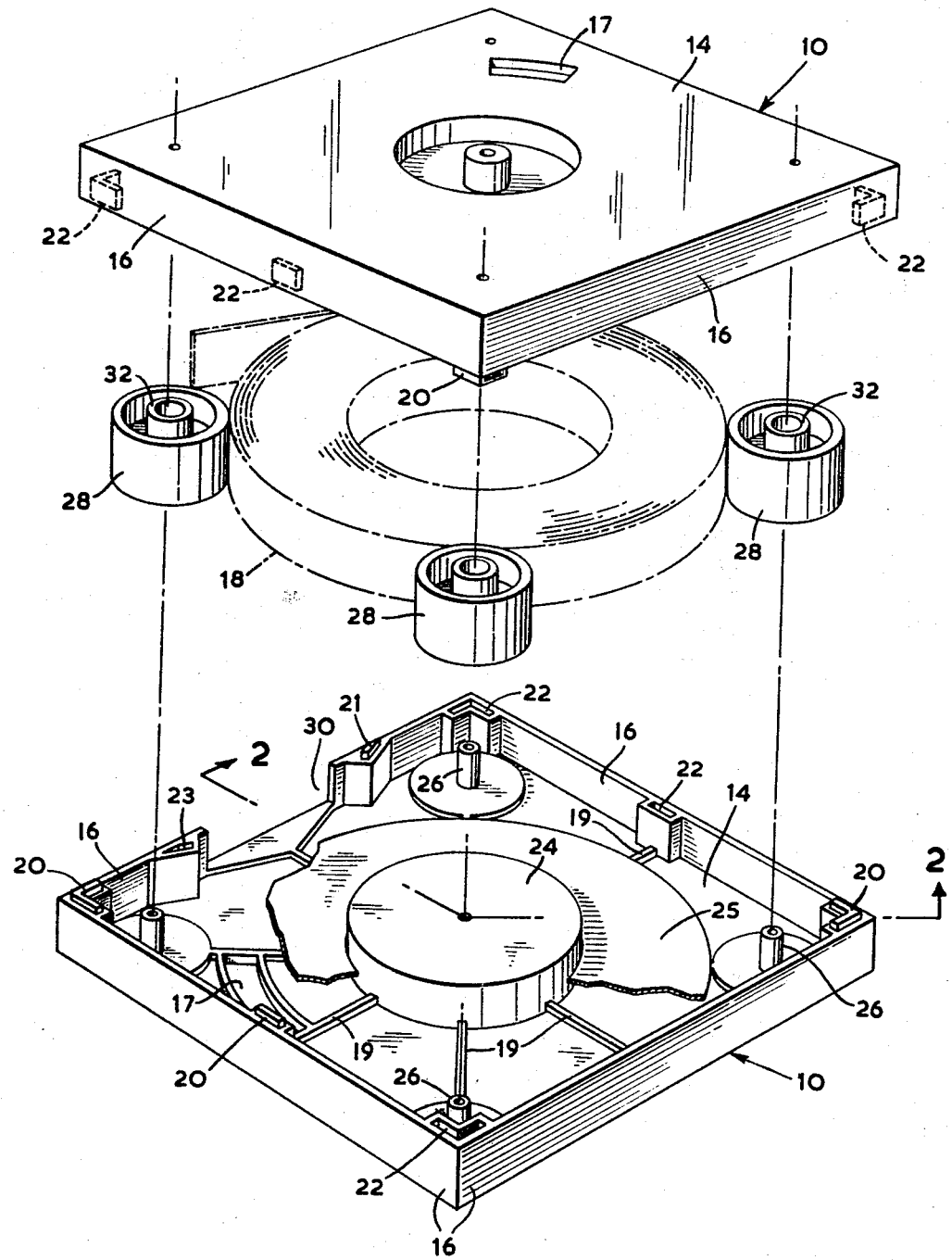
FIGURE 1 is an exploded view illustrating a container according to this invention and a coil of saw blade.
Figure 2:
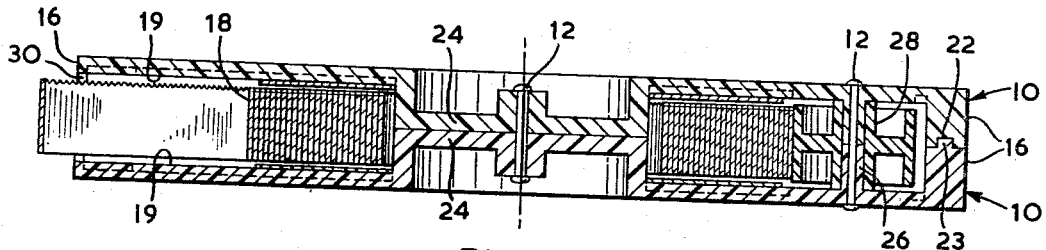
FIGURE 2 is a view along the line 2—2 of FIGURE 1 but showing the container assembled.

Referring to the drawings, the container illustrated in FIGURES 1 and 2 comprises a pair of similar cooperating body members 10 secured together by means of rivets 12 to define therebetween a chamber having side walls 14 and end walls 16 to house the coil 18 of the saw blade. It will be noted that the cooperating body members 10 meet along a meeting line and that they are each formed with pin means 20 and 21 and socket means 22 and 23 which cooperate with each other when the sections are assembled together to strengthen the union of the sections. The body members 10 are preferably moulded from a hard plastic material and the pin and socket means are easily formed by the moulding process.

Figure 3:
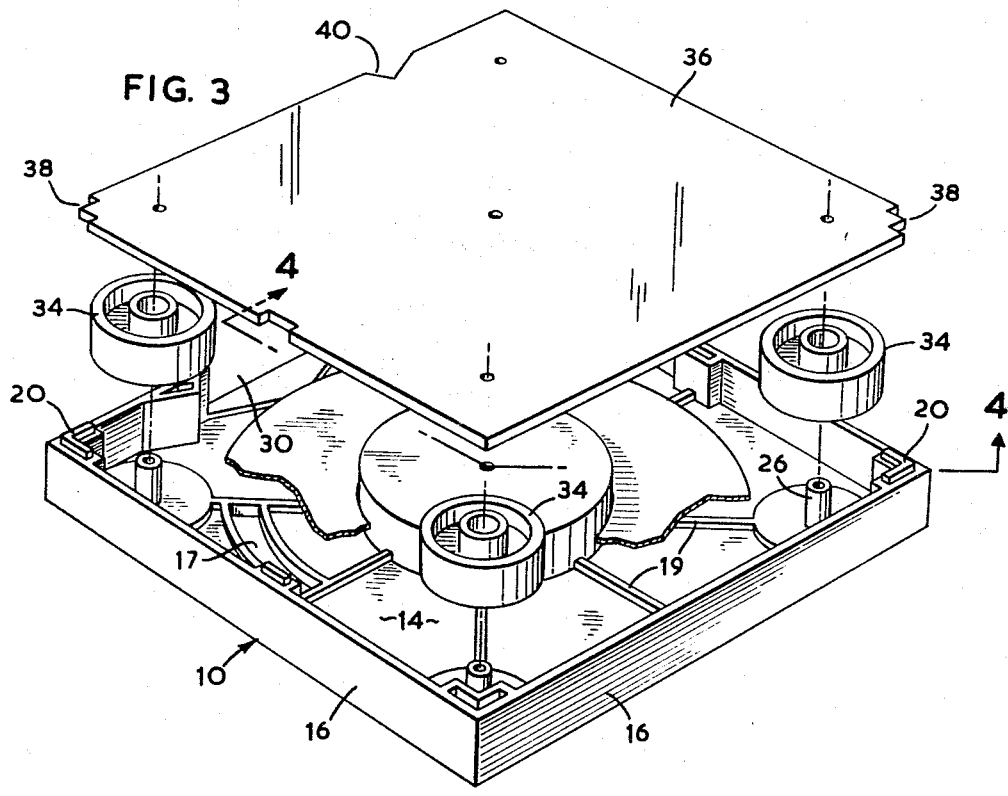
FIGURE 3 is a container having one-half the depth in exploded form.

Side walls 14 have a centre spool 24 adapted to enter the hole at the centre of the coil 18 and radially extending ribs 19 against which the side of coil 18 can react in use. The purpose of ribs 19 is to provide a bearing surface of restricted area to reduce friction. An annular disk 25 of paper, hardboard, corrugated paperboard or the like is preferably placed in the bottom of each section as indicated in FIGURE 3 for the purpose of taking up any slack between the width of the saw blade roll and the depth of the container. Preferably the container is of transparent plastic so that the disk can be printed and be visible from the outside of the package.

Each of the body sections 10 has four pins 26 extending therefrom over which extends, in rolling bearing relation, a roller 28. The four rollers 28 are spaced apart by their respective pins in a circular arrangement such that their rolling surfaces engage and roll over the outside turn of the coil 18 as it is drawn from the container through the opening 30 in an end wall 16 of the container. Rollers 28 turn about their respective pins 26 as the free end of the saw blade is withdrawn. During the operation the sides of the coil bear against the disks 25 on each section which are in turn supported by bars 19. It will be noted that rollers 28 are each formed on both of their sides with an annular bearing surface 32. The surface 32 is small and adapted to frictionally engage with the side of the container as its respective roller turns in use. There is lateral play of rollers 28 so that friction between these surfaces is not excessive.

The container shown in FIGURES 1 and 2 has two identical sections 10. It will be noted that pins 20 are located at opposed corners and sockets 22 are also located at opposed corners whereby when two identical sections are edge mated, the corner pins of each fit into the corner sockets of the other. Moreover, opening 30 is centrally located on a side wall and the pin means 21 on one edge of each section is adapted to enter into the socket means 23 of the similar cooperating section when two sections are edge mated to form a container.

Figure 4:
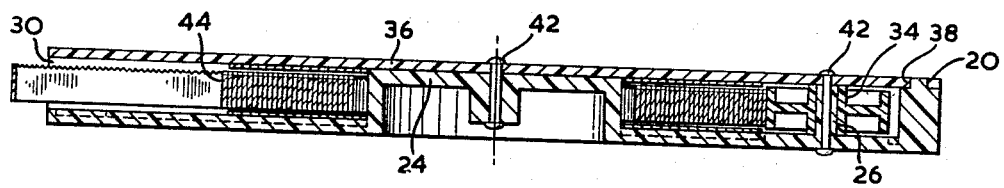
FIGURE 4 is a view along the line 4—4 of FIGURE 2 but showing the container assembled.

FIGURES 3 and 4 illustrate a container having half the width using one section 10 similar to the sections from which the container of FIGURES 1 and 2 was made, a plate 36 of flat plastic and rollers 34 of half the width of rollers 28 to make a container with a saw blade housing of one-half the width to house a roll of saw blade of less width. The plate 36 is matched at opposite corners as at 38 to form a socket-like mating with the pin means 20 and notched at one side as at 40 to form a socket-like mating with the pin means 21. The sections are riveted together by rivets 42 when a coil 19 of saw blade is mounted therein for withdrawal from the opening 30 as the outside coil thereof is drawn over the rollers 34 which rotate on their pins 26.

Numeral 17 is provided to re-thread the free end of the saw blade over the roller next to the opening in the event that it should become withdrawn into the package past the roller.

It will be apparent that saw blades can be conveniently packaged with safety in the package of this invention and that it can be easily dispensed therefrom by drawing the free end through the opening 30 as the outside layer is rolled over the rollers. The package can be used for the full range of saw blades from 3/16" to 1¼" by stocking one tray-like section 16 and a flat plate 36, large rollers 28, small rollers 34, and a variety of disks 25 having varied thickness.

For example, the largest size saw blade would be packaged in a package made from two sections 16, large rollers 28 and a thin paper disk 25. The middle size would be packaged in a package made from one section 16, one section 36, small rollers 34 and a thin paper disk. Sizes in between would be packed in the same size package as the large one but would use thicker paper disks. Sizes smaller than the mid size would be packed in the same basic container as the mid size with the exception that a thicker disk 25 would be used. Thus, by stocking relatively few moulded parts and a variety of cheap paper disks of varied thicknesses, one can package a complete range of saw blades. The package is cheap to make, but above all it dispenses the saw blade in a free and easy manner not heretofore possible.

Embodiments of the invention other than the one illustrated will be apparent to those skilled in the art and it is not intended that the foregoing description should be read in a limiting sense.

What I claim as my invention is:

1. A dispensing container for band saw blades and the like comprising a pair of cooperating body members secured together along a meeting line to define therebetween a saw blade receiving chamber, said saw blade receiving chamber having opposed side walls and end walls extending between said side walls, spaced co-opertaing bearing ribs on the inner surface of each body member, said ribs extending from the center portion of said body members substantially to the periphery thereof, a plurality of rollers, means mounting said plurality of rollers on said body for rotation in said chamber with their rolling surfaces at right angles to the plane of the bearing surfaces of said bearing ribs, said rollers being spaced apart in a circular arrangement with their rolling surfaces adapted to roll with respect to the outside face of a coil of saw blade in said chamber as it is uncoiled from said chamber, one of said end walls being formed with an opening through which the free end of a coil of saw blade can be drawn in use.

2. A dispensing container as claimed in claim 1 in which said means for mounting said rollers on said body comprises pin bearing means carried by at least one side wall of said body.

3. A dispensing container as claimed in claim 2 in which at least one of said body members is formed with pin means at said meeting line, the other of said body members being formed with socket means, said pin means engaging in said socket means.

4. A dispensing container as claimed in claim 2 in which said meeting line of said body members extends around said end walls.

5. A dispensing container as claimed in claim 1 in which said body members are formed with pin and with socket means at said meeting line, said pin means on each body member engaging in said socket means of the other body member.

6. A dispensing container as claimed in claim 1 in which said meeting line of said body members extend around said end walls.

References Cited by the Examiner

UNITED STATES PATENTS

| 2,255,577 | 9/1941 | Wilkie | 206—52 |
| 3,015,384 | 1/1962 | Kellogg | 206—52 |
| 3,075,627 | 1/1963 | Kuckhoff | 206—52 X |
| 3,099,414 | 7/1963 | Kulka. | |
| 3,127,989 | 4/1964 | Travagilo | 206—52 |

FOREIGN PATENTS

| 928,857 | 6/1963 | Great Britain. |

THERON E. CONDON, *Primary Examiner.*

MARTHA L. RICE, *Examiner.*